(12) United States Patent
Yacoub

(10) Patent No.: US 7,997,065 B2
(45) Date of Patent: Aug. 16, 2011

(54) DEVICE FOR ESTIMATING THE LOAD STATE OF A $NO_x$ STORAGE CATALYTIC CONVERTER

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 855 days.

(21) Appl. No.: 11/970,044

(22) Filed: Jan. 7, 2008

(65) Prior Publication Data

US 2008/0163608 A1 Jul. 10, 2008

(30) Foreign Application Priority Data

Jan. 9, 2007 (DE) .......................... 10 2007 001 417

(51) Int. Cl.
*F01N 3/00* (2006.01)
(52) U.S. Cl. ................. 60/277; 60/274; 60/276; 60/285
(58) Field of Classification Search .................... 60/276, 60/277, 285, 301; 73/23.31, 114.69, 114.71, 73/114.72, 114.73, 114.75
See application file for complete search history.

(56) References Cited

U.S. PATENT DOCUMENTS

| | | | | |
|---|---|---|---|---|
| 3,962,866 A * | 6/1976 | Neidhard et al. | ............... | 60/276 |
| 5,177,464 A * | 1/1993 | Hamburg | ...................... | 340/439 |
| 5,408,215 A * | 4/1995 | Hamburg | ...................... | 340/439 |
| 5,686,654 A * | 11/1997 | Friese et al. | .................. | 73/23.32 |
| 6,145,305 A * | 11/2000 | Itou et al. | ......................... | 60/277 |
| 6,385,966 B2 * | 5/2002 | Zhang | ............................. | 60/274 |
| 6,637,197 B1 * | 10/2003 | Stahl | ............................... | 60/295 |
| 6,645,361 B1 * | 11/2003 | Bloemer et al. | ............... | 204/426 |
| 2002/0108367 A1 | 8/2002 | Surnilla et al. | | |

FOREIGN PATENT DOCUMENTS

DE 19922981 11/2000
* cited by examiner

*Primary Examiner* — Thomas E Denion
*Assistant Examiner* — Jason Shanske
(74) *Attorney, Agent, or Firm* — Julia Voutyras; Alleman Hall McCoy Russell & Tuttle LLP

(57) ABSTRACT

A device for estimating the loading state of a NOx storage catalytic converter. The device includes a module for determining the oxygen concentration difference between an oxygen concentration present in the exhaust gas upstream of the $NO_X$ storage catalytic converter and an oxygen concentration present in the exhaust gas downstream of the $NO_X$ storage catalytic converter, and a controller for estimating the loading state of the $NO_X$ storage catalytic converter on the basis of said oxygen concentration difference.

12 Claims, 4 Drawing Sheets

--Prior Art--

DEVICE FOR ESTIMATING THE LOAD STATE OF A $NO_x$ STORAGE CATALYTIC CONVERTER

The present application claims priority to German Patent Application No. 102007001417.3, entitled "Device for estimating the loading state of a NOx storage catalytic converter", filed Jan. 9, 2007, the entire contents of which are incorporated herein by reference.

BACKGROUND AND SUMMARY $NO_X$ storage catalytic converters serve to absorb and store nitrogen oxides ($NO_X$) which may be emitted, in particular, by diesel engines operating in a lean-burn combustion mode. In response to a $NO_X$ storage catalytic converter being saturated with nitrogen oxide molecules, an operating phase with a rich air/fuel ratio may be performed for a duration of typically a number of seconds in order to regenerate the $NO_X$ storage catalytic converter in what may be known as a regeneration phase. During this phase, the stored nitrogen oxide molecules may be released and converted into components such as nitrogen, carbon dioxide and water vapour for example. The frequency with which a regeneration of said type may take place may be dependent on the nitrogen oxide emissions of the internal combustion engine, the storage capacity of the $NO_X$ storage catalytic converter, and the temperature of the exhaust gases of the internal combustion engine.

Previous approaches for determining the suitable times at which a regeneration of the $NO_X$ storage catalytic converter is required encompass the estimation of the $NO_X$ loading as a function of the $NO_X$ emission rate and the storage capacity of the $NO_X$ storage catalytic converter. In such approaches, the $NO_X$ emission rate of the internal combustion engine may either directly measured by means of a $NO_X$ sensor or is estimated with the aid of a model. In a $NO_X$ model of this type, $NO_X$ concentrations measured in the exhaust gas of the internal combustion engine to be listed as a function of the operating state of the internal combustion engine (that is to say the engine speed and engine load), and corrected as a function of the coolant temperature and the composition of the recirculated exhaust gas.

The storage capacity of the $NO_X$ storage catalytic converter may be a function of the measured or estimated catalytic converter temperature and the estimated $NO_X$ loading. The suitable time for a termination of the regeneration phase in one approach may be determined using a lambda probe arranged downstream. According to another approach, it is also possible to use a model for determining the $NO_X$ conversion rate, with the regeneration phase being terminated when the calculated loading falls below a predefined threshold value. In order to realize an on-board diagnostic (OBD) function, a $NO_X$ sensor which is arranged downstream of the $NO_X$ storage catalytic converter may be used in order to signal when the $NO_X$ emissions exceed the prescribed limit values.

Several publications, for example U.S. Pat. No. 6,645,361 B1 and also for example the SAE publication "Thick Film $ZrO_2$ $NO_X$ Sensor" by N. Kato et al., publication no. 960334 of the Society of Automotive Engineers, Inc., Reprint from Electronic Engine Controls 1996 (SP-1149), International Congress & Exposition, Detroit (Mich.), 26-29 Feb. 1996, disclose electro-chemical gas sensors which can be used for $NO_X$ determination.

FIG. 1 schematically shows an example of an electro chemical gas sensor, such as described in the above citations. Sensor 1 may include a first chamber 2 connected to a second chamber 3 via a duct which extends through a diffusion barrier layer 4. A constant predetermined oxygen partial pressure is generated in the first chamber 2 by pump electrodes 5 by way of the supply or discharge of oxygen. The gas which is supplied via the duct of the second chamber 3 is reduced by way of electrodes 6. Electrodes 6 are arranged in second chamber 3 and include a catalytic material, so as to generate nitrogen and oxygen, whereupon a pump voltage which is proportional to the $NO_X$ concentration is tapped off. In addition, a heating device 7 is provided, to increase the temperature of the chambers or the pump electrodes to approximately 600° C. to 700° C. resulting in more efficient operation, and which can be surrounded for example by an insulating $Al_2O_3$ layer.

In one approach, in order to determine the $NO_X$ loading of a $NO_X$ storage catalytic converter, two $NO_x$ sensors may be used, one of which is arranged upstream of the $NO_X$ storage catalytic converter and the other of which is arranged downstream of the $NO_X$ storage catalytic converter.

However, the inventors have recognized that there may be several issue with such an approach. In particular, using two sensors to determine $NO_X$ loading of the $NO_X$ storage catalytic converter may result in considerable technical expenditure and corresponding costs with regard to the required provision of the corresponding monitoring device for the loading state.

Thus, it is an object of the present disclosure to provide a device for estimating the load state of an emission control device, such as a $NO_X$ storage catalytic converter, which permits reliable determination of the state of the device, such as the $NO_X$ load, with reduced technical expenditure and a corresponding reduction in cost. Note that the approach may applied to determining other loadings of an emission control device, such as oxygen loading, particulate matter loading, reductant loading, etc.

In one approach described herein, at least some of the above issues may be addressed by a device for estimating the loading state of a $NO_X$ storage catalytic converter, comprising: a module for determining the oxygen concentration difference between an oxygen concentration present in the exhaust gas upstream of the $NO_X$ storage catalytic converter and an oxygen concentration present in the exhaust gas downstream of the $NO_X$ storage catalytic converter, and a controller for estimating the loading state of the $NO_X$ storage catalytic converter on the basis of said oxygen concentration difference.

By determining the loading state of the $NO_X$ storage catalytic converter directly based on the oxygen concentration difference between an oxygen concentration which is present in the exhaust gas upstream of the $NO_X$ storage catalytic converter and an oxygen concentration which is present in the exhaust gas downstream of the $NO_X$ storage catalytic converter, the expenditure for actuating, heating, and for processing and evaluating the signals for two separate sensors which measure absolute oxygen concentration at different locations may be condensed to a single module. In this way, a significant reduction in the technical expenditure and associated costs may be obtained.

In addition, the estimation of the loading state of the $NO_X$ storage catalytic converter directly on the basis of the oxygen concentration difference has measurement-related advantages as a result of the significant reduction in the absolute measuring error which can be obtained in the case of a difference measurement in comparison to an absolute value determinations. In this way, the accuracy of the determination of the loading state of the $NO_X$ storage catalytic converter may be improved.

Further, the present application also contemplates a system for an engine, comprising: a unitary sensor communicating with exhaust gas at at least a first and second position in an exhaust of the engine, the sensor responsive to gas concentrations of the first and second positions; and a controller for adjusting engine operation responsive to the unitary sensor. The controller may adjust fuel injection, air-fuel ratio, estimation of catalyst NOx and/or oxygen loading, diagnostics, etc. The gas concentrations may include NOx, oxygen, etc. Also, the first and second positions may be upstream and downstream of an emission control device, respectively. Alternatively, the first and second positions may be in two separate exhaust conduits coupled to separate engine banks. Still other positions may also be used.

BRIEF DESCRIPTION OF THE DRAWINGS

The disclosure is explained below by means of preferred embodiments, with reference to the accompanying figures in which.

DETAILED DESCRIPTION

Figure 2:
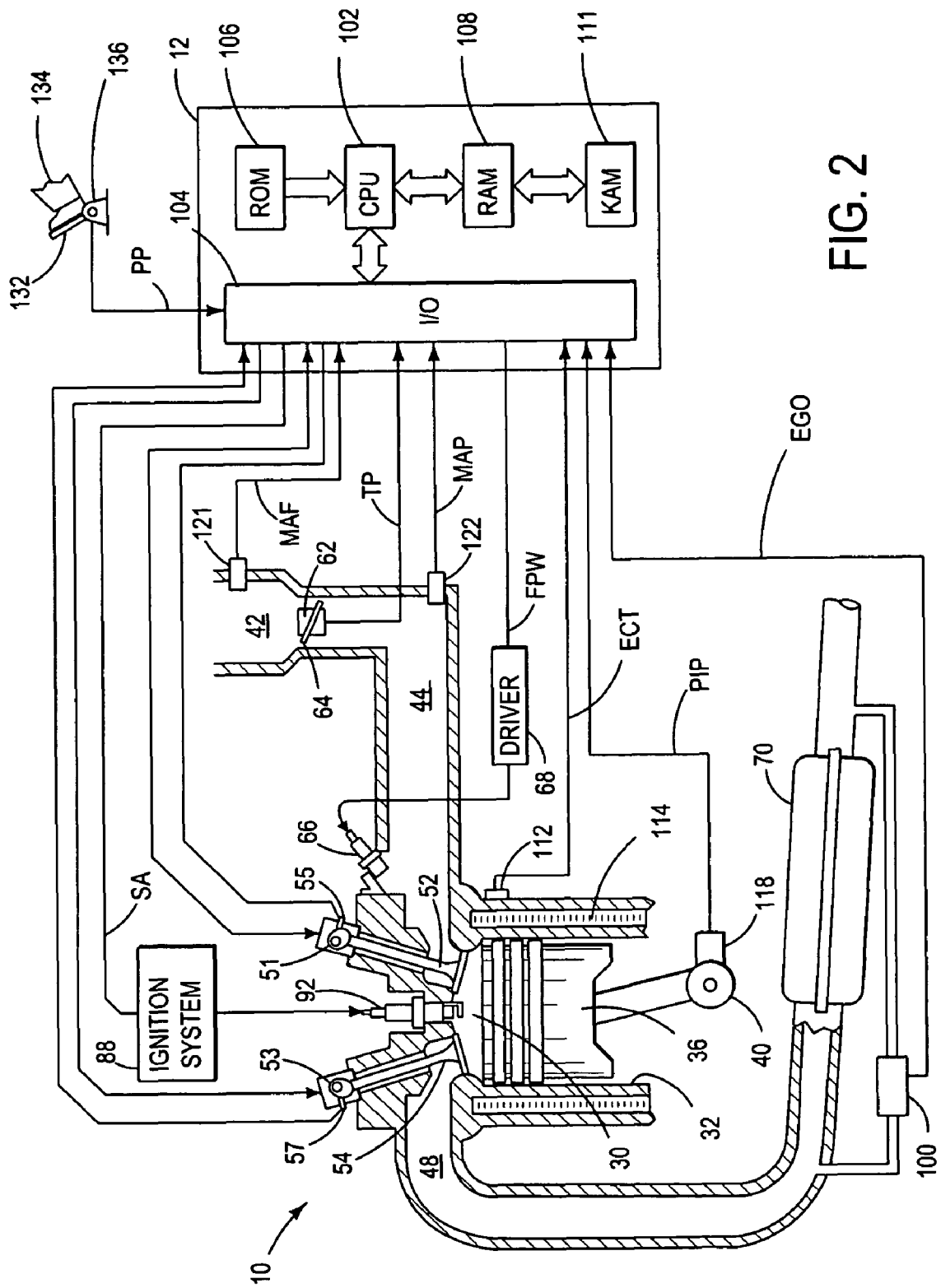
FIG. 2 shows a schematic illustration of an example embodiment of one cylinder of a multi-cylinder engine system.

FIG. 2 is a schematic diagram showing one cylinder of multi-cylinder engine 10, which may be included in a propulsion system of an automobile. Engine 10 may be controlled at least partially by a control system including controller 12 and by input from a vehicle operator 134 via an input device 132. In this example, input device 132 includes an accelerator pedal and a pedal position sensor 136 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 121 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Unitary gas sensor or device 100 is shown coupled to exhaust passage 48 at a position upstream of emission control device 70 and a position downstream of emission control device 70. It will be appreciated that in some embodiment device 100 may be in communication with various different positions of the exhaust passage. For example, the device may be in communication with two different positions of the passage upstream of the emission control device or the device may be in communication with two different positions of the passage downstream of the emission control device. Device 100 may be configured to generate a signal indicative of the concentrations of exhaust gas (e.g. $NO_X$) and/or oxygen of exhaust gas of the two positions upstream and downstream of the emission control device. The sensor may send the differential measurement to the controller. Further the controller may be configured to adjust an operating parameter of the engine based on the measurement of device 100. In one particular example, the device may indicate NOx stored in the device, and the air-fuel ratio of the engine may be adjusted by the controller via adjustment of fuel injection to the engine.

In some embodiments, engine system 10 may include other exhaust gas sensors such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 111, and a data bus. Controller 12 may receive various signals from sensors coupled to engine 10, in addition to those signals previously discussed, including measurement of inducted mass air flow (MAF) from mass air flow sensor 121; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 2 shows only one cylinder of a multi-cylinder engine, and that each cylinder may similarly include its own set of intake/exhaust valves, fuel injector, spark plug, etc.

Figure 3A:
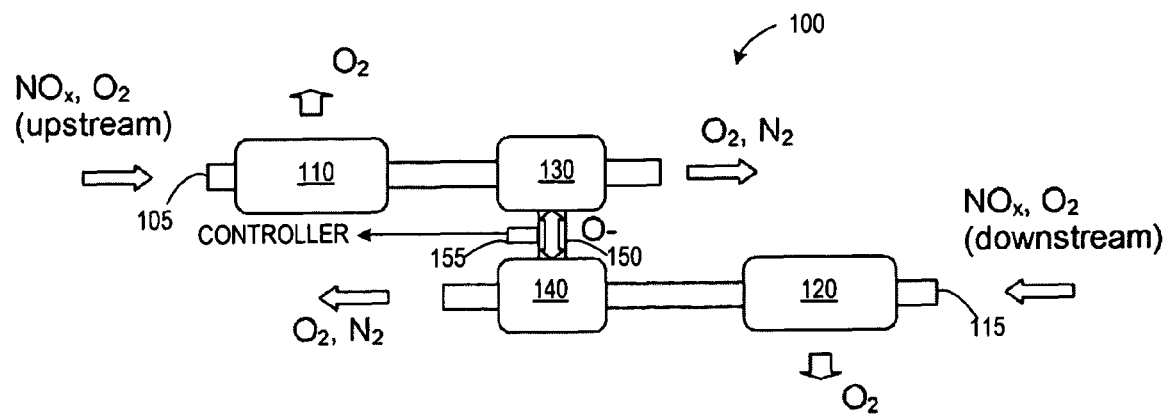
FIG. 3A-3B show schematic illustrations of a device according to the present disclosure for monitoring the loading state of a $NO_X$ storage catalytic converter as per a first embodiment.

FIG. 3A shows a schematic illustration of an exemplary embodiment of a device or module for monitoring the loading state of a $NO_X$ storage catalytic converter. The device may provide an output for indicating a differential NOx concentration between at least two separate locations in the exhaust, such as upstream and downstream of an emission control device. The differential NOx sensor output may then be used to adjust engine operation to provide improved control of air-fuel ratio (e.g., via fuel injection adjustment) switching between rich and lean when used with a NOx storage catalytic converter, for example.

Device 100 comprises a first upstream chamber 110 which is connected to an exhaust line 105 upstream of the $NO_X$ storage catalytic converter, and a first downstream chamber 120 which is connected to the exhaust line 115 downstream of the $NO_X$ storage catalytic converter.

Figure 3B:
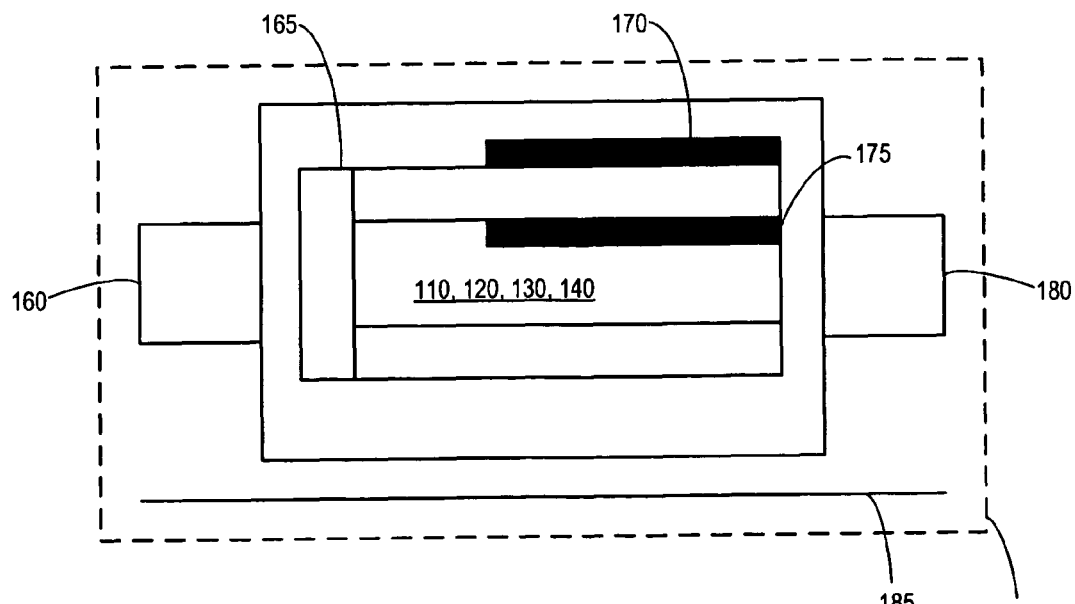

FIG. 3B shows one example of a construction chambers 110, 120, 130, 140. Exhaust gas containing $NO_X$ and $O_2$, may enter chamber 110, 120, 130, 140 via entry passage 160. The exhaust gas may pass through a defined diffusion barrier or a predetermined diffusion resistance 165. The chamber may include one electrochemical pump cell 170 with at least one inner pump electrode 175, by means of which the oxygen content of the exhaust gas situated in chamber may be reduced to a predetermined level. In the cases of chambers 110, 120 the predetermined level may include 1000 ppm, with no $NO_X$ conversion taking place yet in the chambers 10 and 20 in each case. In one example, in order to set a constant oxygen level a pump voltage of 150 mV may be applied to chambers 110, 120.

Returning to FIG. 3A, first upstream chamber 110 may supply exhaust gas with a regulated oxygen level to second upstream chamber 130 and first downstream chamber 120 may supply exhaust gas with a regulated oxygen level to second downstream chamber 140. The exhaust gas from chambers 110, 120 may enter chambers 130, 140 via a defined diffusion barrier or a predetermined diffusion resistance.

Figure 1:
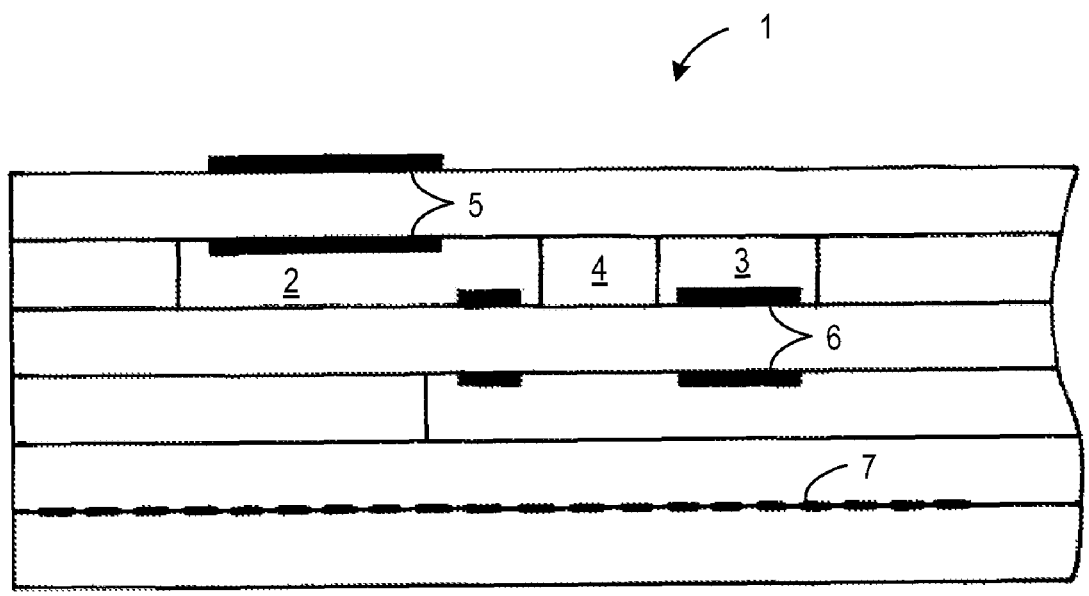
FIG. 1 shows a schematic illustration of the construction of an electrochemical NOX sensor as per the prior art.

In some embodiments, the realization of the chambers 110, 130 and 120, 140 which are in each case connected to one another by means of a predetermined diffusion resistance can be constructed in a $ZrO_2$ multi-layer system in which the respective chambers 110, 130 and 120, 140 are formed as internal hollow spaces or cavities between adjacent $ZrO_2$ layers. The suitable construction of a $ZrO_2$ multi-layer system is fundamentally known, for example from the SAE publication "Thick Film $ZrO_2$ $NO_X$ Sensor" by N. Kato et al., publication no. 960334 of the Society of Automotive Engineers, Inc., Reprint from Electronic Engine Controls 1996 (SP-1149), International Congress & Exposition, Detroit (Mich.), 26-29 Feb. 1996 as mentioned in the introduction, with reference being made to the schematic arrangement shown in FIG. 1. The pump electrodes for the chambers 110-140 can for example be formed as porous electrodes made from platinum (Pt) or rhodium (Rh) with a typical thickness of 10 μm. In addition, in each case one heating device or element 185 (shown in FIG. 3B) is provided, by means of which the temperature of the chambers or of the pump electrodes can, for more efficient operation, be increased to approximately 600° C. to 700° C., and which can be surrounded by an insulating $Al_2O_3$ layer 190.

In the chambers 130, 140, the oxygen content of the gas situated in the respective chamber 130 or 140 may be further reduced to a level of 0.0001 ppm, for example. In one example, in order to set the constant oxygen level, a pump voltage of 450 mV may be applied to the respective chambers 130, 140. As a result, in chambers 130, 140, the $NO_X$ content of the exhaust gas situated in the respective chambers 130, 140 may be reduced, with a reaction to nitrogen and oxygen taking place according to the reaction equation:

$$NO \rightarrow \tfrac{1}{2}*N_2 + \tfrac{1}{2}*O_2 \qquad (1).$$

The reduction of the $NO_X$ can additionally be assisted by forming the pump electrodes in the relevant chamber 130, 140 from a catalytic material such as for example rhodium (Rh).

Since the partial pressure or the concentration of the oxygen in each chamber 130, 140 is proportional to the $NO_X$ concentration in each chamber, the oxygen partial pressure in the second upstream chamber 130 may be an indirect measure of the $NO_X$ concentration in the exhaust line upstream of the $NO_X$ storage catalytic converter, and the oxygen partial pressure in the second downstream chamber 140 may be likewise a measure for the $NO_X$ concentration in the exhaust line downstream of the $NO_X$ storage catalytic converter.

The device may utilize the fact that a difference of the oxygen partial pressures or concentrations between the chambers 130 and 140 constitutes a measure for the difference between the upstream and downstream $NO_X$ concentration.

Situated between the two chambers 130 and 140 is a Nernst cell 150 in which an electromotive force $E_F$ may be generated, for which the following relationship applies:

$$E_F = \ln(P_{O2, 30}/P_{O2, 40}) \qquad (2).$$

Here, $P_{O2, 30}$ denotes the oxygen partial pressure in the second upstream chamber 30, and $P_{O2, 40}$ denotes the oxygen partial pressure in the second downstream chamber 140. A sensor 155 measures the electromotive force $E_F$ generated in the Nernst cell 150 and outputs a corresponding output signal which serves as a measure for the difference between the $NO_X$ concentration upstream of the $NO_X$ storage catalytic converter and the $NO_X$ concentration downstream of the $NO_X$ storage catalytic converter. The signal may be sent to a controller to process the differential measurement information.

In a further step in the controller, the $NO_X$ loading of the $NO_X$ storage catalytic converter may be estimated by way of the following equation:

$$\text{Loading}(NO_X) = f(\Delta(NO_X) - U(NO_X)) \quad (3),$$

where $\Delta(NO_X)$ denotes the difference between the $NO_X$ concentration upstream of the $NO_X$ storage catalytic converter and the $NO_X$ concentration downstream of the $NO_X$ storage catalytic converter, and where $U(NO_X)$ denotes the $NO_X$ conversion rate. In one example, the conversion rate $U(NO_X)$ of the $NO_X$ conversion may be determined in a model-assisted manner as a function of the stored $NO_X$ concentration, the temperature of the $NO_X$ storage catalytic converter, the air/fuel ratio in the exhaust gas ("richness") and the exhaust gas mass flow rate.

The arrangement according to the embodiment shown in FIG. 3A has, as can be seen, the advantage of a significant reduction in the technical expenditure and the associated costs, since the expenditure for actuating (in particular heating) the apparatus and for processing and evaluating the signals which are delivered is required not for two sensors which measure an absolute oxygen concentration, but instead may be condensed to a single differential module.

According to an alternative embodiment, it is also possible for electrochemical pumping of oxygen ($O_2$) to take place from the chamber 240 into the chamber 230 or vice versa, with a current signal being generated which is proportional to the difference in the $NO_X$ concentrations in the exhaust line upstream of the $NO_X$ storage catalytic converter and downstream of the $NO_X$ storage catalytic converter.

Figure 4:
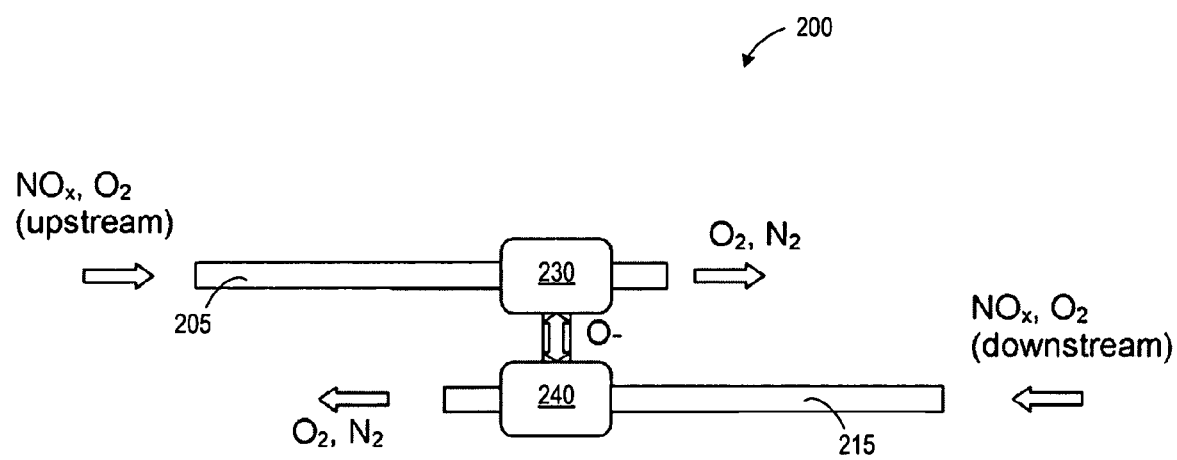
FIG. 4 shows a schematic illustration of a second embodiment of a device for monitoring the loading state of a $NO_X$ storage catalytic converter according to the present disclosure.

FIG. 4 shows a possible modification of device 100 shown in FIG. 3A, to dispense with the chambers 10 and 20 as described in the above embodiment. Here, in comparison to FIG. 3A, substantially functionally identical elements are denoted by corresponding reference symbols, increased by 100. In the device 200 shown in FIG. 3, chamber 230 may receive exhaust gas from upstream of the $NO_X$ storage catalytic converter via pipe 205 and chamber 240 may receive exhaust gas from downstream of the $NO_X$ storage catalytic converter. Further, electrochemical pumping takes place between the chambers 230 and 240. Here, a current signal may be generated that may be proportional to the difference in the oxygen partial pressures or the oxygen concentrations in the chambers 230 and 240, and therefore likewise constitutes a measure for the difference between the $NO_X$ concentration upstream of the $NO_X$ storage catalytic converter and the $NO_X$ concentration downstream of the $NO_X$ storage catalytic converter.

According to the present disclosure, therefore, instead of a direct measurement of absolute values of the $NO_X$ concentration (or of the oxygen partial pressures which are characteristic thereof), the difference between the oxygen partial pressures or the oxygen concentrations in the chambers 130 and 140 (and therefore the difference $\Delta(NO_X)$ between the $NO_X$ concentration upstream of the $NO_X$ storage catalytic converter and the $NO_X$ concentration downstream of the $NO_X$ storage catalytic converter) may be determined in order to monitor the loading state of a $NO_X$ storage catalytic converter.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for estimating a loading state of a $NO_X$ storage catalytic converter, with the $NO_X$ storage catalytic converter storing nitrogen oxides which are contained in an exhaust gas of an internal combustion engine, the device comprising:

a module for determining an oxygen concentration difference between an oxygen concentration present in the exhaust gas upstream of the $NO_X$ storage catalytic converter and an oxygen concentration present in the exhaust gas downstream of the $NO_X$ storage catalytic converter, the module comprising a first chamber provided in a section of an exhaust line that is upstream of the $NO_X$ storage catalytic converter having a first oxygen concentration; and a second chamber provided in a section of the exhaust line that is downstream of the $NO_X$ storage catalytic converter having a second oxygen concentration, the first chamber and the second chamber each being configured to reduce nitrogen oxide ($NO_X$) to form nitrogen and oxygen, and wherein the module is configured to determine an oxygen concentration difference between the first oxygen concentration and the second oxygen concentration; and a controller for estimating the loading state of the $NO_X$ storage catalytic converter based on the oxygen concentration difference, wherein the module for determining the oxygen concentration difference includes a Nernst cell provided between the section of the exhaust line that is upstream of the $NO_X$ storage catalytic converter and the section of the exhaust line that is downstream of the $NO_X$ storage catalytic converter, and wherein the Nernst cell includes a first end and a second end, the first end connected to the first chamber that is provided in the section of the exhaust line that is upstream of the $NO_X$ storage catalytic converter and the second end connected to the second chamber that is provided in the section of the exhaust line that is downstream of the $NO_X$ storage catalytic converter.

2. The device of claim 1, further comprising:

at least one electrochemical pumping cell to affect oxygen concentration in at least one of the first chamber and the second chamber.

3. The device of claim 1, further comprising:

a third chamber connected to the first chamber and is provided in the section of the exhaust line that is upstream of the $NO_X$ storage catalytic converter; and a fourth chamber connected to the second chamber and is provided in the section of the exhaust line that is downstream of the $NO_X$ storage catalytic converter, the third chamber and the fourth chamber each configured to reduce the oxygen concentration of the respective chamber to a predetermined level.

4. The device of claim 1, wherein the controller for estimating the loading state of the $NO_X$ storage catalytic converter carries out an estimation based on the relationship:

$$\text{Loading}(NO_X) = f(\Delta(NO_X) - U(NO_X)),$$

where $\Delta(NO_X)$ denotes a $NO_X$ concentration difference, calculated from the oxygen concentration difference, between a $NO_X$ concentration upstream of the $NO_X$ storage catalytic converter and a $NO_X$ concentration downstream of the $NO_X$ storage catalytic converter, and where $U(NO_X)$ denotes a $NO_X$ conversion rate in the $NO_X$ storage catalytic converter.

5. A system for estimating a load state of a $NO_X$ storage catalytic converter positioned in an exhaust gas conduit, comprising:
- a first chamber receiving exhaust gas from a region of the exhaust gas conduit upstream of the $NO_X$ storage catalytic converter;
- a second chamber receiving exhaust gas from a region of the exhaust gas conduit downstream of the $NO_X$ storage catalytic converter;
- at least a first electromechanical pumping cell to reduce oxygen concentration of the upstream exhaust gas in the first chamber and the downstream exhaust gas in the second chamber to a first predetermined level;
- a third chamber to receive exhaust gas from the first chamber;
- a fourth chamber to receive exhaust gas from the second chamber;
- at least a second electromechanical pumping cell to reduce oxygen concentration of the exhaust gas in the third chamber and the exhaust gas in the fourth chamber to a second predetermined level lower than the first predetermined level;
- a Nernst cell in communication with the third chamber and the fourth chamber, the Nernst cell generating an electromotive force based on a differential of an oxygen partial pressure in the third chamber and the an oxygen partial pressure in the fourth chamber;
- a sensor to generate a signal in response to reading the electromotive force generated by the Nernst cell; and
- a controller configured to receive the sensor signal and output a load state of the $NO_X$ storage catalytic converter based on the received sensor signal.

6. The system of claim 5 wherein the at least the second electromechanical pumping cell includes at least one of platinum and rhodium.

7. The system of claim 5 wherein $NO_X$ conversion only takes place in the second chamber and the third chamber.

8. The system of claim 5 further comprising:
- one heating element to heat the first, second, third, and fourth chambers.

9. The system of claim 5 wherein the load state is based on the difference between a $NO_X$ concentration upstream of the $NO_X$ storage catalytic converter and a $NO_X$ concentration downstream of the $NO_X$ storage catalytic converter and a function of the stored $NO_X$ concentration, a temperature of the $NO_X$ storage catalytic converter, an air/fuel ratio in the exhaust gas ("richness") and an exhaust gas mass flow rate.

10. An engine system for an engine, comprising:
- a multi-chamber unitary sensor including a first oxygen-regulating chamber coupled to upstream exhaust;
- a second oxygen-regulating chamber coupled to downstream exhaust;
- third and fourth chambers coupled between the first and second chambers with the third chamber coupled between the first and fourth chambers and the fourth chamber coupled between the third and second chambers;
- a Nernst cell coupled between the third and fourth chambers generating a differential $NO_x$ concentration; and
- an emission control device, wherein the differential $NO_x$ concentration is across the emission control device.

11. The system of claim 10 further comprising a first pump electrode for the first chamber, and a second pump electrode for the second chamber.

12. The system of claim 10 further comprising a controller for adjusting the air-fuel ratio of the engine responsive to the differential $NO_x$ concentration from the unitary sensor.

* * * * *